United States Patent [19]

Chou

[11] Patent Number: 5,133,074
[45] Date of Patent: Jul. 21, 1992

[54] DEADLOCK RESOLUTION WITH CACHE SNOOPING

[75] Inventor: Horng-Yee Chou, Cupertino, Calif.
[73] Assignee: Acer Incorporated, Taipei, Taiwan
[21] Appl. No.: 308,206
[22] Filed: Feb. 8, 1989
[51] Int. Cl.[5] .................. G06F 13/14; G06F 13/36
[52] U.S. Cl. .................. 395/725; 364/242.7; 364/243.4; 364/940.1; 364/964.2
[58] Field of Search ... 364/200 MS File, 900 MS File

[56] References Cited

U.S. PATENT DOCUMENTS

| | | | |
|---|---|---|---|
| 4,231,086 | 10/1980 | Tarbox et al. | 364/200 |
| 4,318,182 | 3/1982 | Bachman | 364/200 |
| 4,319,321 | 3/1982 | Anastas | 364/200 |
| 4,494,193 | 1/1985 | Brahm | 364/200 |
| 4,602,327 | 7/1986 | LaViolette | 364/200 |
| 4,754,398 | 6/1988 | Pribnow | 364/200 |
| 4,754,400 | 6/1988 | Wakahara | 364/200 |
| 4,769,769 | 9/1988 | Gregrouis | 364/200 |
| 4,791,554 | 12/1988 | Hirota et al. | 364/200 |

Primary Examiner—David Y. Eng
Attorney, Agent, or Firm—Mark A. Haynes; Greg T. Sueoka

[57] ABSTRACT

A device for resolving deadlock between a local processor and system resources for access to a local store in a multiprocessor data processing system having high speed cache comprises an address storage device, deadlock resolution logic and a deadlock detector. The address storage device is coupled to the local bus for storing addresses in response a local store access signal on the system bus and for supply of the address to the cache controller. The detector is connected to the local bus and system bus to detect a deadlock condition. The deadlock resolution logic generates a sequence of control signals in response to the deadlock signal that resolves the deadlock condition. In particular, deadlocks are resolved by tristating the local buffer in response to the deadlock signal to disable external access signals from controlling the local bus to allow a local store access signal to gain control of the local bus. If the local store access signal is a write access, the address of the write access is stored in the address store, and the local buffer is released from the high impedance state of allow the external access signal to control the local bus. After the external access signal completes, the address for the address store is supplied to the cache controller for performance of snooping function. If the local store access signal is a read access, then the local buffer is released from its high impedance state after the read access completes.

11 Claims, 3 Drawing Sheets

DEADLOCK RESOLUTION WITH CACHE SNOOPING

FIELD OF THE INVENTION

The present invention relates to deadlock resolution in data processing systems in which a local processor having a cache and a local store generates requests for use of system resources, and other resources in the system generate requests for access to the local store. In particular, the present invention is an apparatus and method for resolving deadlocks caused by simultaneous occurrence of a request for access to system resources by the local processor and a request for access to the local store by another system resource.

BACKGROUND OF THE INVENTION

In a multiprocessor system, there is typically a system bus that provides communication among a plurality of system resources. One of the system resources may be a local processor with a cache controller and cache in combination with a local store. When a write from another system resource to the local store occurs, the cache controller must be notified so that it can invalidate the validity codes for data in the cache corresponding to the write address to the local store.

The local store can be accessed across the system bus by other resources in the system, or by the local processor itself. Further, the local processor may generate requests for access to system resources across the system bus. A deadlock occurs when the local processor attempts to use the system bus while the system bus is attempting to access the local store.

Significant processors in the data processing industry, such as Intel's 80386, do not support bus cycle retry. Thus, once a bus cycle is started, such as an attempt to use system resources, that cycle must run its course. Therefore, if the processor generates a system access request that becomes deadlocked, it will continue in a wait state until the deadlock is resolved.

Further, important cache controllers in the industry, such as Intel's 82385, prevent invalidating of validity bits in the cache unless the local bus is relinquished. However, the local bus will not be relinquished until the deadlocked system access request is satisfied.

Accordingly, there is a need for a method and apparatus for resolving deadlocks in data processing systems of this type.

SUMMARY OF THE INVENTION

The present invention provides a deadlock resolution scheme for a multiprocessor data processing system characterized by at least one local processor having a high speed cache and a local store, in which the local processor may generate requests for access to system resources simultaneously with a request from another system resource for access to the local store.

According to one aspect, the present invention is an apparatus that comprises a system bus and a local bus. A system buffer buffers communication of local store access signals from the system bus to the local bus. A local store coupled to the local bus stores data for read and write access in response to the local store access signals on the local bus. A local processor generates external access signals for supply across the local bus, through the system buffer to the system bus. The local processor includes a cache having a tag store storing validity codes for corresponding storage locations in the cache. Further, the local processor includes a cache controller which includes apparatus for searching the cache tag store to determine the validity codes for locations in the tag. This tag searching from the local bus side is otherwise known as snooping. The system further includes a local buffer for buffering communication of the external access signals and other signals from the local processor to the local bus that is characterized by having a high impedance state which disables signals from the local processor on the local bus. Finally, logic resolves deadlocks that occur when an external access signal from a local processor is on the local bus at the same time that a local store access signal is on the system bus attempting to gain control of the local bus.

The logic resolving the deadlock includes an address store coupled to the local bus that stores in response to a store control signal an address from a local store access signal on the local bus and for supply of the address to the cache controller. Further, the deadlock resolving logic includes a decoder connected to the local bus and the system bus for detecting the deadlock condition. The logic generates control signals in a control sequence in response to the deadlock signal, wherein the control signal sequence includes:

1) asserting a signal to tristate the local buffer in response to the deadlock signal to disable the external access signal from controlling the local bus to allow a local store access signal from the system bus to gain control of the local bus, 2) if the local store access signal is a write access, then the address of the write access is stored into the address store, and the local buffer is released from the high impedance state to allow the external access signal to control the local bus, and after the external access signal completes, the address from the address store is supplied to the cache controller for performance of the snooping function, and 3) if the local store access signal is a read access, then the local buffer is released from its high impedance state after the read access completes.

According to another aspect, the present invention can be characterized as a method for resolving the deadlock in accordance with the control sequence just set forth.

Other aspects, advantages, and features of the present invention can be determined by review of the figures, detailed description, and claims which follow.

DETAILED DESCRIPTION

Figure 1:
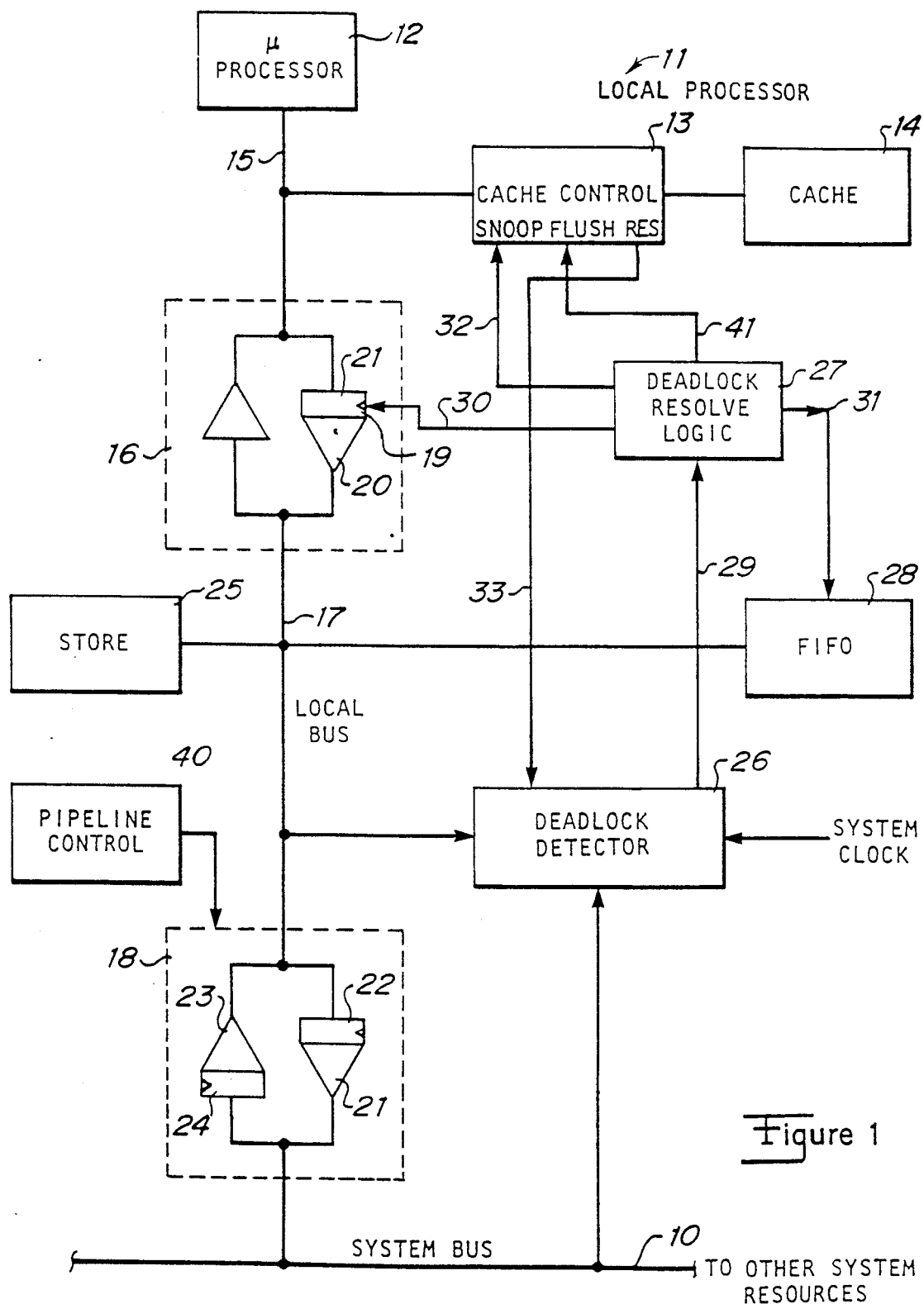
FIG. 1 is a block diagram of a data processing system according to the present invention.

FIG. 1 is a block diagram of a data processing apparatus according to the present invention. It is characterized by a system bus 10 which is connected to a plurality of system resources. One such system resource is illustrated in FIG. 1. The one system resource includes a local processor 11. The local processor includes a microprocessor 12 such as in the Intel 80386, a cache controller 13 such as an Intel 82385, and a high speed cache 14 implemented using storage elements such as static RAM. A portion of the storage area in the cache controller 13 stores a cache tag which stores validity codes for corresponding data locations in the cache 14.

The local processor 11 includes a local processor port 15 to which the microprocessor 12 and cache controller 13 are connected. The local processor port 15 is coupled through local buffer 16 to a local bus 17. Local bus 17 is connected to system buffer 18 which provides for communication between the system bus 10 and the local bus 17 The local buffer 16 and system buffer 18 may be implemented using 74646 buffers as known in the art. These buffers are characterized by a tristate input 19 which tristates the output of the local port outgoing buffer 20. Further, the outgoing buffer 20 includes a pipeline register 21 and the outgoing buffer 21 on the system buffer 18 likewise includes a pipeline register 22 forming an outgoing pipeline for external write accesses.

The incoming buffer 23 on system buffer 18 includes a pipeline register 24 forming an incoming pipeline for local store write access signals coming from the system bus.

A pipeline controller 40 is coupled to the buffer 18 for controlling the inbound and outbound pipelines. The tristate buffers have post-write pipeline registers in a conventional post-write pipeline configuration. Thus, any write can be stored in a pipeline register to be finished later while a current bus cycle is finished. For the system buffers 18, two way pipelining is used. Because a single incoming write can be held in a pipeline register, a single write will not cause a deadlock. Thus, the inbound pipeline controller 63 and outbound pipeline controller 53 must indicate to the deadlock logic when the respective pipelines are full.

A local store 25 which may be implemented using an array of dynamic RAMs as known in the art, is coupled to the local bus 17. This store 25 is a high capacity store which typically maintains current data in the system. A subset of the data in the store 25 is moved to the cache 14 as known in the art to provide quick access to that data for the local processor 11. The tag within the cache controller 13 is updated by the cache controller 13 in a snooping function that marks data invalid in the cache when the corresponding line of data in the local store 25 is updated, and under other circumstances as known in the art.

A deadlock occurs when a local store access signal from the system bus 10 attempts to gain control of the local bus 17 for access to the store 25, at the same time that an external access signal from the local processor 11 has control of the local bus 17 and is attempting to gain control of the system bus 10. This deadlock is resolved, according to the present invention, using the deadlock detector 26, deadlock resolve logic 27 and the FIFO buffer 28.

The deadlock detector detects the occurrence of a local store access signal on the system bus 10 and an external access signal on the local bus 17 during a system clock cycle. When the deadlock is detected, a deadlock signal is generated and transmitted across line 29 to the deadlock resolve logic 27 The deadlock resolve logic 27 then generates control signals on line 30 to buffer 16, line 31 to the FIFO 28, line 32 to the oache controller 13 and line 41 to the cache controller 13 according to a control sequence as set out in FIG. 3.

In the embodiment using the 82385 cache controller 13, the cache controller generates a release signal on line 33 which is supplied to the local bus requestor. For the 82385, the signal on line 33 is the BHLDA-bus hold acknowledge signal as specified for the cache controller 13.

Figure 2:
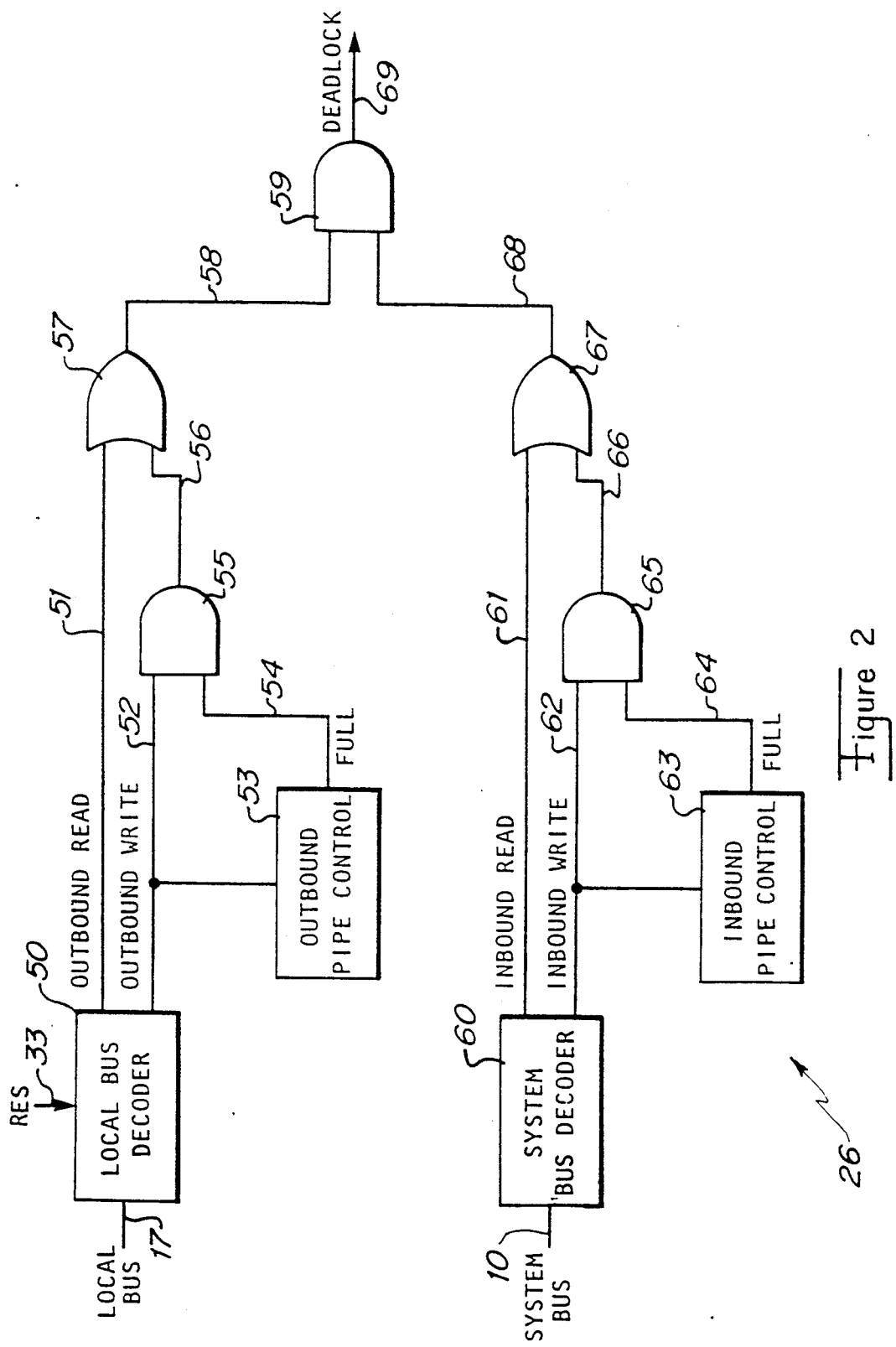
FIG. 2 is a schematic diagram of the deadlock detector according to the present invention.

FIG. 2 is a logic diagram for the deadlock detector 26. The deadlock detector 26 is coupled to the local bus 17 and the system bus 10. A local bus decoder 50 is disabled by the release signal on line 33 which indicates that the local bus 17 has been released by the local processor. The local bus decoder 50 detects an outbound read on line 51, and an outbound write on line 52. In addition, the outbound write signal on line 52 is supplied to an outbound pipe controller 53 (from pipeline controller 40 of FIG. 1). If the outbound pipe is full, the outbound pipe controller 53 generates a full signal on line 54. The outbound write on line 52 and outbound full on line 54 are coupled to AND gate 55. The output of AND gate 55 is connected on line 56 as one input to OR gate 57. The second input to OR gate 57 is the outbound read signal on line 51. The output of OR gate 57 is supplied on line 58 as an input to AND gate 59.

The deadlock decoder 26 also includes a system bus decoder 60 which detects an inbound read access on line 61 and an inbound write access on line 62. The inbound write signal is supplied to an inbound pipe controller 63 (from pipeline controller 40 of FIG. 1) which generates an inbound pipe full signal on line 64. The inbound write signal on line 62 and the inbound full signal on line 64 are connected as inputs to AND gate 65. The output of AND gate 65 is connected across line 66 as an input to OR gate 67. The second input to OR gate 67 is the inbound read signal on line 61. The output of OR gate 67 is connected across line 68 as a second input to AND gate 59. The output of AND gate 59 is the deadlock signal on line 69 which is clocked by the system clock and supplied across line 29 to the deadlock resolve logic 27 of FIG. 1.

According to the present invention, the tristate enable pin 19 of buffer 16 is controlled by the deadlock resolve logic 27 rather than the cache controller 13. The deadlock resolve logic 27 constantly monitors for a deadlock condition. If a deadlock occurs, then the buffer 16 is tristated without informing the cache controller 13. The local bus ready signal does not return to the local processor and therefore wait states are added. The local processor 12 and cache controller 13 are not aware that a deadlock is occurring.

The requester on the system bus will enter the local bus and access the local memory. If the access is a write cycle, then the address is stored in FIFO 28. When the access is completed, the requester from the system bus will relinquish both the local bus and the system bus. The request for the system bus by the local processor continues to be active. At this time, the tristate is relinquished on buffer 16 allowing the local processor 11 to regain control of the local bus 17. When it obtains local bus 17 and no deadlock is detected, then it will eventually obtain the system bus and finish its access. After the external access is completed by the local processor, the release signal is generated across line 33, freeing the local bus for further activity. At this point, the deadlock resolve logic 27 gains the local bus for the FIFO 28. The FIFO dumps its stored address or addresses to the local bus in sequence for supply to the cache controller 13 snooping function. The snooping function is activated by a control signal across line 32 from the deadlock resolve logic 27 to the cache controller 13.

If the external bus master does burst writes, or if the local processor has trouble gaining the system bus because of other higher priority activity, multiple writes to the local store 25 may occur before the external access by the local processor 11 succeeds. In this case, more than one address is stored in the FIFO 28, and multiple snoop cycles are executed.

The FIFO size is chosen to meet normal system requirements. A typical system may include, for instance, eight storage locations in the FIFO 28.

If the number of writes to the local store 25 exceeds the size of FIFO 28 before the external access by the local processor is successful, then the deadlock resolve logic 27 issues an overflow signal on line 4 to the cache controller 13 flush input to invalidate all storage locations in the cache.

Figure 3:
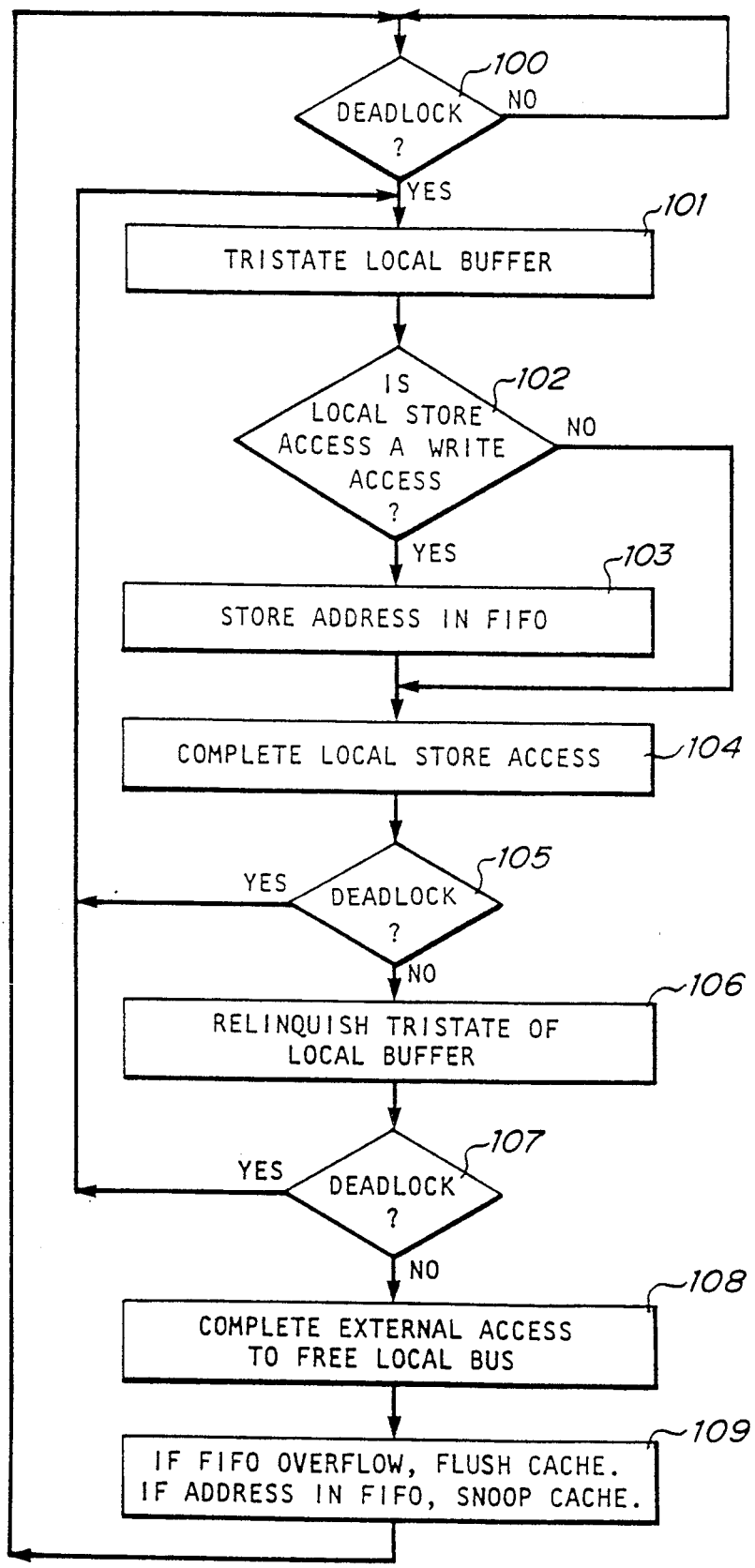
FIG. 3 is a flow chart illustrating the method of resolving the deadlock according to the present invention.

The method for resolving deadlocks according to the present invention is summarized in the flow chart shown in FIG. 3 for systems such as illustrated in FIG. 1.

The control sequence begins by detecting a deadlock (block 100). If no deadlock is detected in block 100, then the deadlock resolve logic sits in a waiting loop. If a deadlock is detected, then the local buffer is tristated (block 101). The local bus ready signal is prevented from returning to the local processor and the local processor is in a wait state.

The deadlock resolve logic determines whether the local store access signal which gains the local bus is a write access (block 102). If it is a write access, then the address for the write is stored in the FIFO (block 103). If the access is not a write access, or after the address of the write is stored in the FIFO, then the local store access is completed (block 104). After completion of the local store access, the logic determines whether a deadlock condition persists, such as occurs during burst accesses (block 105). If the deadlock persists, then the algorithm loops to block 101. If the deadlock is not persisting in block 105, then the tristate of the local buffer is relinquished (block 106). At that point, the external access that has been held in a wait state may be able to gain control of the local bus once again. The deadlock resolve logic then determines whether a deadlock condition exists (block 107), such as may occur if another higher priority bus master comes in. If there is a deadlock, then the control logic loops to block 101 and tristates the local buffer once again. This creates a loop in which the local processor may be forced to wait through a sequence of write accesses to the local store from an external bus master(s).

If there is no deadlock detected at block 107, then the external access maintains control of the local bus and is allowed to eventually complete across the system bus (block 108). Once the external access completes, the cache controller will issue the release signal indicating the local bus is free.

At this time, the deadlock resolve enables the snooping of the cache required due to any write accesses that occurred during the deadlock. Thus, if the FIFO has overflowed, the cache is flushed. If there is an address in the FIFO, then the cache is snooped to invalidate any lines of data in the cache that correspond to locations that have been written in the store 25 (block 109). After completion of the cache snooping, the algorithm loops to block 100 to begin waiting for a subsequent deadlock.

As can be seen, this scheme for resolving the deadlocks allows resolution of deadlocks involving writes to a local store while maintaining the integrity of cache data.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in Order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

We claim:

1. A data processing apparatus comprising:
a system bus;
a local bus;
system buffer means, having a first interface connected to the system bus and a second interface connected to the local bus, ±or buffering communication of local store access signals from the system bus to the local bus;
local storage means, coupled to the local bus, for storing data for read and write access in response to local store access signals on the local bus;
local processing means, having a local bus port, for processing data and supplying external access signals to the local bus port, the local processing means including
cache means, having a plurality of storage locations, for storing data retrieved from the local storage means in the plurality of storage locations, and
tag means, having a plurality of tag locations identified by addresses, for storing validity codes in tag locations for corresponding storage locations in the cache means,
tag search means, having a tag search input and coupled to the tag means, for determining the validity codes at tag locations in response to addresses and a tag search signal at the tag search input;
local buffer means, having a first interface connected to the local bus port on the local processor means and a second interface connected to the local bus, for buffering communication of external access signals from the local processor means to the local bus, the local buffer means including
means, having a tristate control input, for disabling the second interface in response to a tristate signal supplied to the tristate control input;
deadlock resolving means, coupled to the system bus and the local bus, for resolving deadlocks caused by local store access signals on the system bus and the external access signals on the local bus, including
address storage means, having a control input and coupled to the local bus, for storing in response to a store signal at the control input an address from a local store access signal on the local bus, for supply to the tag search means in response to a supply signal at the control input,
decoding means, connected to the local bus and the system bus, for generating a deadlock signal in response to a local store access signal on the system bus and an external access signal on the local bus, logic means, connect to the tag search means, address storage means and the local buffer means, for generating the tristate signal, the store signal, the supply signal and the tag search signal in a control sequence, wherein the control sequence includes asserting the tristate signal in response to the deadlock signal to disable the external access signal from controlling the local bus to allow a local store access signal from the system bus to gain control of the local bus, if the local store access signal that gains control of the local bus is a write access, then asserting the store signal to store the address of the write access to the address storage means, and after the local store access signal completes the write access, then de-asserting the tristate signal to allow the external access signal to control the local bus, and after the external access signal completes, asserting the supply signal and the tag search signal to invalidate any location in the cache means storing data identified by the address of the write access, and if the local store access signal that gains control of the local bus is a read access, then de-asserting the tristate signal after the read access completes.

2. The apparatus of claim 1, wherein the system buffer means includes a write access pipeline with at least one stage for storing a local store access signal for a write access pending completion of a preceding local store access, and wherein the decoding means generates the deadlock signal for a write access only when the write access pipeline is full.

3. The apparatus of claim 1, wherein the address storage means includes a plurality of address storage locations, and in the control sequence, the supply signal and tag search signal are repeated for each address stored in the address storage means.

4. The apparatus of claim 3, wherein the address storage means includes a first-in-first-out buffer.

5. The apparatus of claim 3, wherein the address storage means includes means for generating an overflow signal if the address storage means overflows, and the tag search means includes means receiving the overflow signal, for marking all tag locations invalid in response to the overflow signal.

6. The apparatus of claim 3, wherein the control sequence includes, before de-asserting the tristate signal after a local store access, a step of maintaining the tristate signal if the deadlock signal persists.

7. In a data processing system having a system bus, a local bus, a system buffer means, a local buffer means, and a local processing means, a method for resolving deadlocks caused by a local store access signal on the system bus and an external access signal on the local bus, said method comprising steps of:

generating a deadlock signal in response to the local store access signal on the system bus and the external access signal on the local bus;

asserting a tristate signal in response to the deadlock signal to disable the local buffer means to allow the local store access signal to gain control of the local bus and execute a local store access operation;

if the local store access signal that gains control of the local bus is a write access to a given address, storing the given address in an address store;

de-asserting the tristate signal to allow the external access signal to control the local bus after the local store access signal completes its access operation; and if the local store access signal that gained control of the local bus was a write access to the given address, supplying the given address stored in the address store to a tag search means, and asserting a tag search signal to invalidate any location in a cache means storing data identified by the given address after the external access signal completes.

8. The method of claim 7, wherein the system buffer means includes a write access pipeline with at least one stage for storing a local store access signal for a write access, and wherein the deadlock signal is generated for a write access only when the write access pipeline is full.

9. The method of claim 7, wherein the address store includes a plurality of address storage locations, and the method further comprises the steps of:

after the step of de-asserting the tristate signal, generating the deadlock signal again if a local store access signal is on the system bus;

after completion of the external access, supplying all addresses stored in the address store to the tag search means; and asserting the tag search signal in sequence to invalidate any location in the cache means storing data identified by the addresses stored in the address store.

10. The method of claim 9, further including the step of generating an overflow signal if the address store overflows, and wherein the tag search means includes means for receiving the overflow signal, for marking all tag locations invalid in response to the overflow signal.

11. The method of claim 9, including before the step of de-asserting the tristate signal, a step of maintaining the tristate signal if the deadlock signal persists.

* * * * *

UNITED STATES PATENT AND TRADEMARK OFFICE
CERTIFICATE OF CORRECTION

PATENT NO. : 5,133,074
DATED      : July 21, 1992
INVENTOR(S) : Horng-Yee Chou

It is certified that error appears in the above-identified patent and that said Letters Patent is hereby corrected as shown below:

On the Title page, item

[57] Abstract, line 20, "state of" should be --state to--.

Col. 3, line 63, "oache" should be --cache--.

Col. 4, lines 45-46, "local processor and therefore" should be --local processor 11 and therefore--.

Col. 5, line 14, "4" should be --41--.

Col. 6, line 23, "bus, tor" should be --bus, for--.

Col. 7, lines 15-16, "then de-assetting" should be --de-asserting--.

Col. 8, line 49, "including" should be --including,--.

Signed and Sealed this

Nineteenth Day of October, 1993

Attest:

BRUCE LEHMAN

*Attesting Officer*      *Commissioner of Patents and Trademarks*